United States Patent [19]

Francioni

[11] Patent Number: 5,113,996
[45] Date of Patent: May 19, 1992

[54] ROTARY MULTIPLE POINT DISCHARGE CONVEYER

[75] Inventor: Renzo Francioni, Prato Sesia, Italy

[73] Assignee: Cavanna S.p.A., Italy

[21] Appl. No.: 666,669

[22] Filed: Mar. 7, 1991

[30] Foreign Application Priority Data

Mar. 7, 1990 [IT] Italy ............................ 67160 A/90

[51] Int. Cl.$^5$ ........................................... B65G 29/00
[52] U.S. Cl. ................................ 198/441; 198/723
[58] Field of Search ................ 198/440, 441, 723, 370

[56] References Cited

U.S. PATENT DOCUMENTS

| | | | |
|---|---|---|---|
| 1,326,903 | 1/1920 | Augensen | 198/441 |
| 1,352,718 | 9/1920 | Ayars | 198/441 |
| 2,362,132 | 11/1944 | Haub | 198/723 X |
| 2,602,533 | 7/1952 | Bruce | 198/441 |
| 2,787,359 | 4/1957 | Gerecke | 198/723 X |
| 3,176,824 | 4/1965 | Eldred et al. | 198/723 |
| 4,239,116 | 12/1980 | Eisenberg et al. | 209/523 |
| 4,467,908 | 8/1984 | Schneider | 198/441 |

FOREIGN PATENT DOCUMENTS

| | | | |
|---|---|---|---|
| 01-59971 | 12/1979 | Japan | 198/441 |
| 00-88534 | 4/1987 | Japan | 198/441 |
| 02-88518 | 11/1989 | Japan | 198/441 |
| 0801454 | 9/1958 | United Kingdom . | |
| 1174453 | 12/1969 | United Kingdom . | |

*Primary Examiner*—H. Grant Skaggs
*Assistant Examiner*—James R. Bidwell
*Attorney, Agent, or Firm*—Evenson, Wands, Edwards, Lenahan & McKeown

[57] ABSTRACT

A device for conveying articles comprises a carousel structure with entrainment elements which can make the articles follow a generally arcuate path between an angular input position and at least one angular output position. The entrainment elements are raised above the plane of sliding of the articles at the latter position, leaving the articles free to be conveyed towards at least one output conveyor.

20 Claims, 4 Drawing Sheets

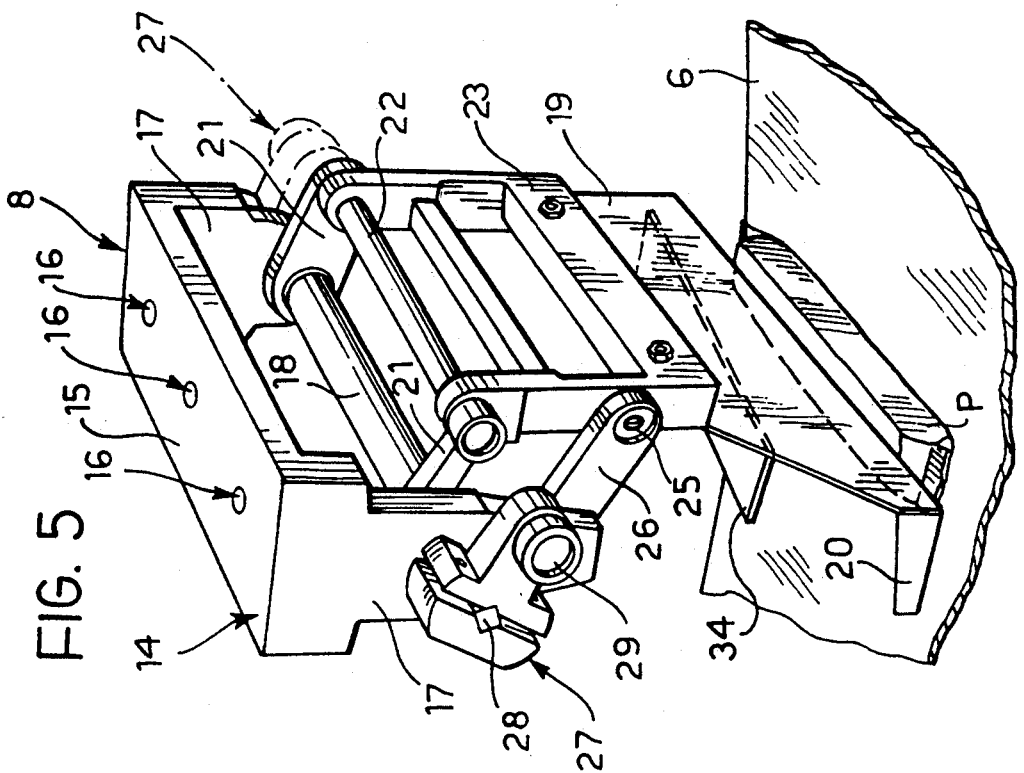
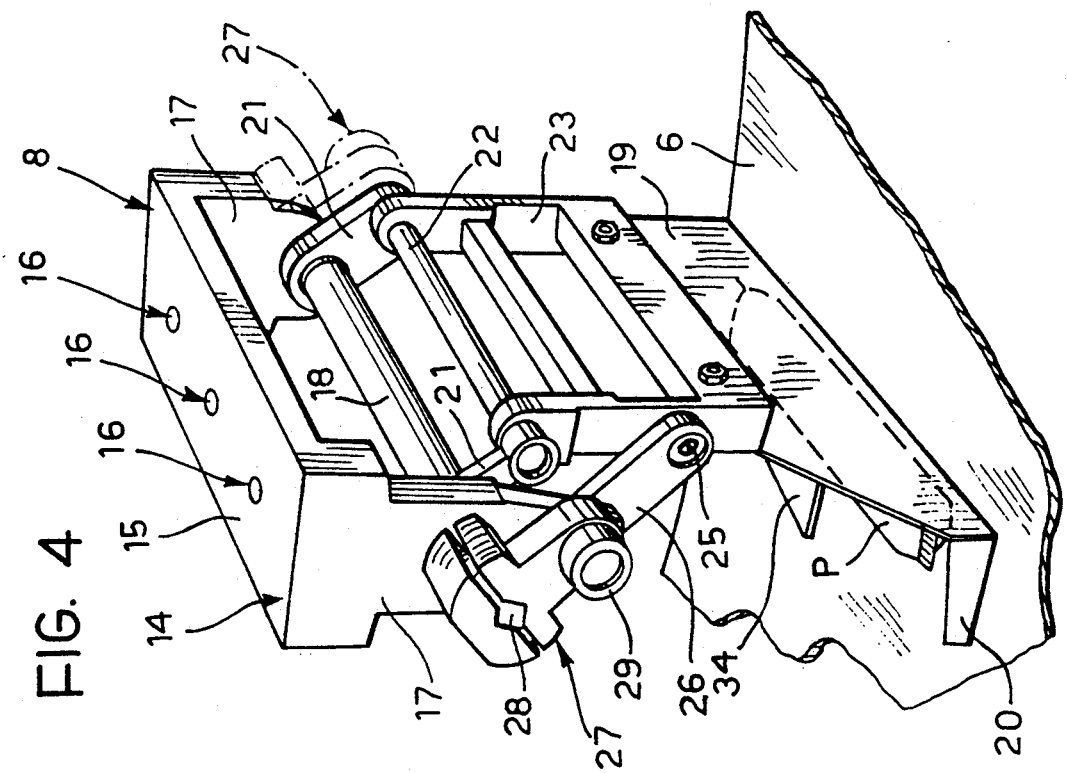

ROTARY MULTIPLE POINT DISCHARGE CONVEYER

BACKGROUND AND SUMMARY OF THE INVENTION

The present invention relates to devices for conveying articles and has been developed with particular attention to its possible use, for example in the field of automatic packaging plants for articles such as food products, etc. Such plants are usually organised with a sequence of operational stations for carrying out successive handling operations on a substantially continuous flow of articles transported on belts and similar conveyor devices.

When the path of advance of the articles through the plant is planned, it is obviously necessary to take account of space requirements and this leads to the definition, from time to time, of specific plant configurations (layouts). In this connection, it is very important to be able to change the path of advance of the articles both by imposing a curved or elbowed course on their flow, and by dividing a flow into two or more branch flows which are not necessarily identical.

For example, it may be useful to arrange for the two branch flows to take up 75% and 25% of the starting flow, respectively. Moreover, it is desirable to be able to modify the layout of a certain plant fairly easily in order to take account of specific requirements of use which may vary temporarily.

The object of the present invention is to provide a conveyor device which can satisfy the requirements stated above perfectly.

According to the present invention, this object is achieved by virtue of a carousel arrangement for moving the articles between input and output conveyors. The carousel has selectively movable means for engaging and releasing the articles at positions corresponding to selected input and output conveyors.

BRIEF DESCRIPTION OF THE DRAWINGS

Other objects, advantages and novel features of the present invention will become apparent from the following detailed description of the invention when considered in conjunction with the accompanying drawings.

FIGS. 4 and 5 show one of the parts of the device according to the invention in two different positions assumed in operation.

DETAILED DESCRIPTION OF THE DRAWINGS

Figure 1:
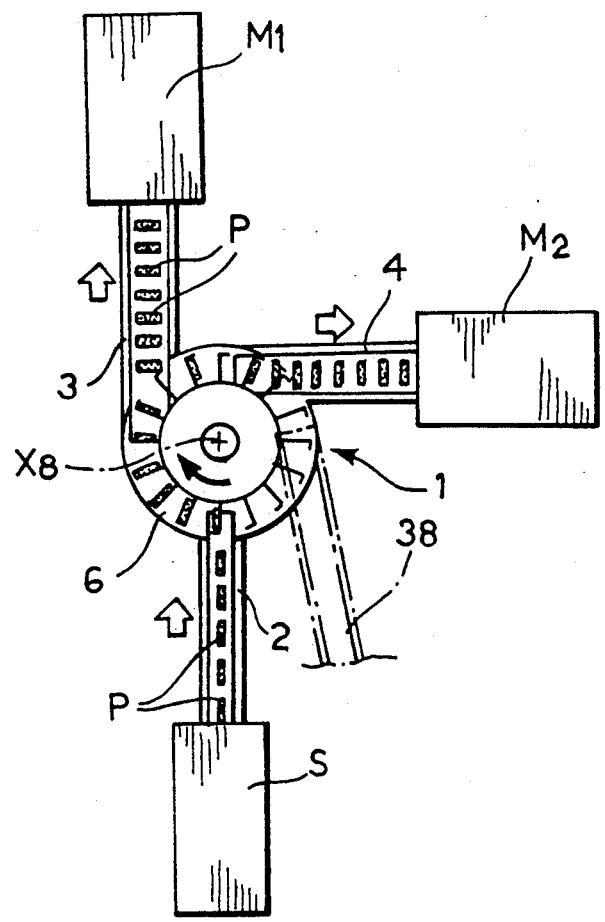
FIG. 1 is a plan view of a device according to the invention forming part of an automatic packaging plant.
Figure 2:
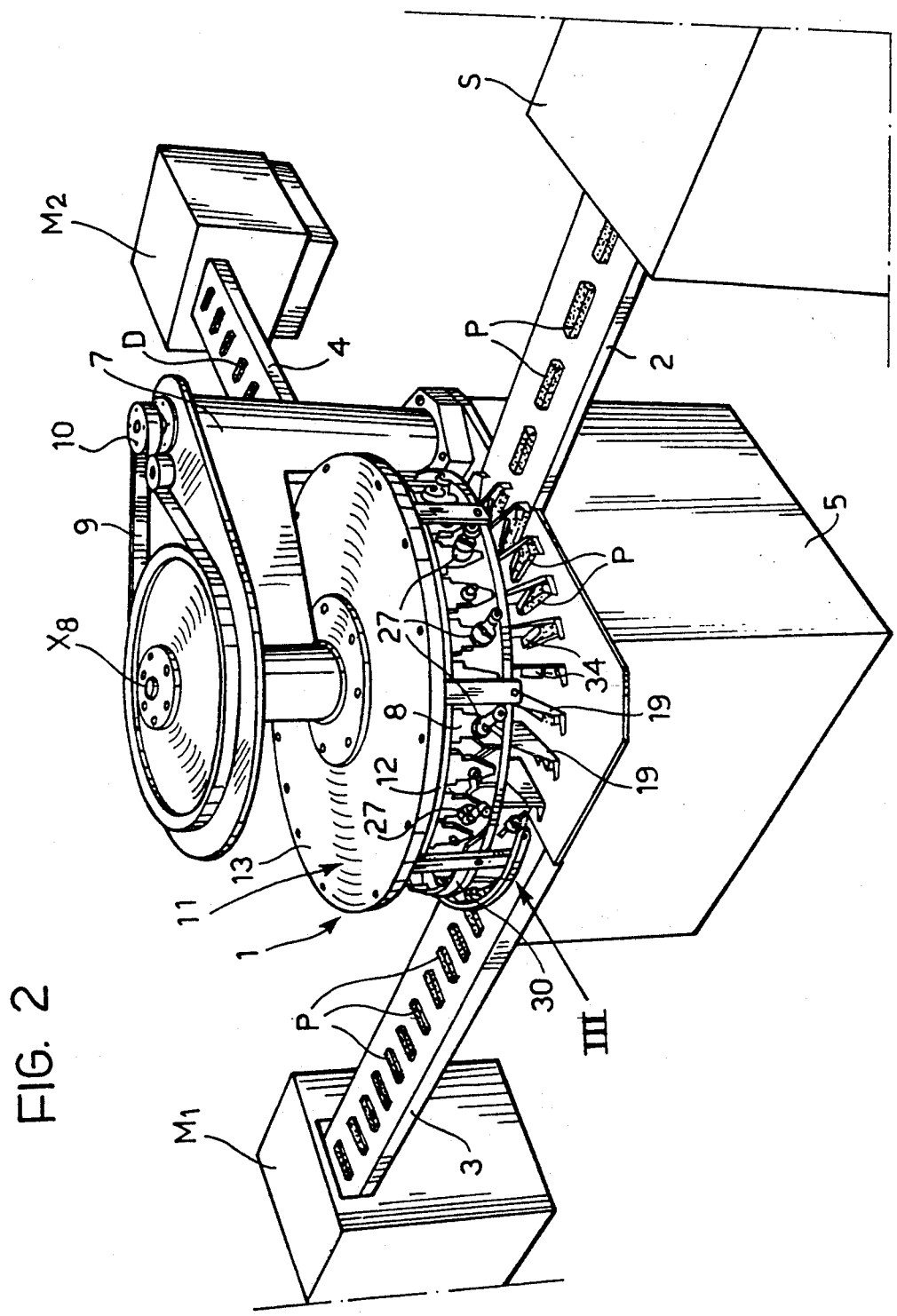
FIG. 2 is a perspective view showing the device visible in FIG. 1 on an enlarged scale.

Referring to FIGS. 1 and 2, a device intended for use in an automatic packaging plant for conveying and distributing articles is generally indicated 1.

For example, the plant may be for the automatic packaging of articles such as food products P which, in the situation to which FIG. 1 relates, emerge from a "source" handling station S to be sent, according to criteria which will be described further below, to two further handling stations M1, M2 located downstream of the source station S in the direction of flow of the articles P. These may be for example, bars of chocolate, small cakes, biscuits, etc. which emerge from the station S lengthwise, that is, with their greatest dimensions oriented in the direction of advance.

In some cases, the station S may be an oven from which products P, such as biscuits, emerge and the stations M1, M2 may then be wrapping machines or the like. In other cases—and still by way of example—the station S may itself be a wrapping machine from which articles P, in the form of chocolate bars or small cakes, emerge already inserted in respective wrappers such as those of the type known as "flow-packs". The stations M1, M2 may then be boxing machines or by further wrapping machines for forming multiple packs of the type currently known as "multipacks" from the individual packages emerging from the station S.

In any case, as will be understood, the nature of the articles P and the type of plant is irrelevant for the purposes of understanding and carrying out the invention.

In general, the articles P are supplied to a first angular position (angular input position) of the device 1 (which, as will be seen better below, has a generally carousel-like structure) on an input conveyor 2 (with a belt or the like) which extends and makes the products P advance in a generally radial direction relative to the device 1.

The articles P leave the device 1 on respective output conveyors 3, 4 (also with belts or the like) which extend towards the output stations M1, M2 at respective angular positions (angular output positions) and branch out from the device 1 in directions approximately tangential thereto.

In the embodiment to which the appended drawings relate, the first output conveyor 3 operates from an angular output position approximately 90° downstream from the angular input position (conveyor 2). The second output conveyor 4, however, operates from an output position approximately 180° from the angular input position.

Naturally, these angular positions are not obligatory and may be selected from a wide range, virtually the only limitation being imposed by the sizes of the various elements concerned.

Thus, the invention can also be applied to situations in which there is only one output conveyor, for example, for diverting the flow of advancing products through a certain angle without dividing it. Moreover, as will be seen better from the following, the same device 1 can easily be switched from a condition of use in which it divides the input flow into two output flows to a condition of use in which the entire input flow is diverted to a selectively predetermined output direction, and vice versa.

It can also be seen that the device 1 generally rotates the articles P on the conveyor through 90°: in particular, the articles P advance on the output conveyors 3, 4 positioned breadwise, that is, with their greatest dimensions perpendicular to the direction of advance.

As can better be seen in the perspective view of FIG. 2, the device 1 consists essentially of a base 5 on which a horizontal plate 6, intended to define a surface of sliding for the articles P which are being transferred, is mounted at a height corresponding to the height of the planes in which the articles P advance on the conveyors 2 to 4.

A rotary carousel-like structure, constituted by a plurality of transfer element 8 whose structure is illustrated in detail in FIGS. 4 and 5, is mounted above the slide surface 6 and is supported by a bracket-like support 7 which projects upwardly from the base 5.

The carousel structure is rotated (clockwise with reference to the drawings) about a vertical axis $X_8$ by means of a belt transmission 9 driven by a vertical shaft 10. The latter is supported within the vertical upright of the bracket-line element 7 and is driven by a motor which is located within the base 5 and is therefore not visible in the drawings.

The carousel structure including the elements 8 is mounted physically within a cage 11 which is also circular or annular in shape and is supported by the In practice, the transfer elements 8 are fixed (bolted) at their upper ends to a disc or plate 12 which is only partially visible in FIG. 2 since it is almost completely hidden by the plate 13 which closes the top of the cage 11.

With reference to FIGS. 4 and 5, it can be seen that each element 8 is constituted essentially by an upper bracket 14 comprising a horizontal central part 15 (which is intended to be bolted to the disc or plate 12: see the holes 16 for the passage of the screws or bolts) from which two side arms 17 extend downwardly and act as supports for a horizontal operating shaft 18. The latter is intended to extend horizontally and radially of the device 1 when the machine is assembled.

A plate 19 for entraining the articles P is connected to the shaft 18 in a general connecting-rod-and-crank configuration and is intended to be moved selectively between a lowered position for entraining the articles P, in which the plate 19 is very close to (ideally in contact with) the slide plate 6 (FIG. 4) and a raised position in which the plate 19 is disengaged from the articles P and in which it is located at a distance from the horizontal slide plate 6 such that the articles P are free to pass beneath it (FIG. 5).

The plate 19 (if seen in plan) is generally L-shaped, having an appendage 20 at its outer edge for restraining the articles P radially according to criteria which will be described further below.

With reference again to the arrangement in which the plates 19 are mounted within the transfer elements 8, it can be seen that two crank-like elements 21 are keyed to the ends of the shaft 18 near the side arms 17 of the bracket 14. The free ends of these support a rod 22 which in turn supports a movable element 23 extending generally vertically and to which the plate 19 is fixed (for example, by screwing).

The movable element 23 is intended, in use, to retain (and hence to impart to the plate 19 connected thereto) a vertical orientation. For this purpose, the element 23 is hinged to the lower end 25 of a pivoting arm 26 whose opposite end (not explicitly shown in FIGS. 4 and 5) is hinged to the homologous side arm 17 of the bracket structure 14.

In other words, the assembly which is the cranks 21 and the arm 26 (and which may possibly be duplicated in a symmetrical manner on the opposite side of the element 23) mounts the movable element on the bracket 14 in an arrangement substantially comparable to an articulated parallelogram.

Finally, a crank 27 is keyed to the shaft 18 (for example, as a result of its coupling with a prismatic shank 28 of the shaft 18 projecting outwardly of the bracket 14) so that it can rotate the shaft 18 selectively and hence raise the plate 19 from the slide plate 6.

At its opposite end, which is generally below the prismatic shank 28, the crank 27 carries a follower 29 in the form of a bearing or functionally equivalent element intended to act as a cam follower in accordance with the criteria which will be described further below.

In general, it is envisaged that the crank 27 may be mounted selectively and equally well on either side of each element 8 as indicated schematically in broken outline in FIGS. 4 and 5. All of this accords with criteria which will be described further below.

In any case, it can be seen that when the follower 29 is raised, it causes a rotation (anticlockwise in the situation shown in FIGS. 4 and 5) of the crank 27, and hence of the shaft 18, which involves the raising of the transfer plate 19 (a change from the position of FIG. 4 to the position of FIG. 5).

When the follower 29 descends, the movable element supported by the shaft 18, and hence the plate 19, tends to return by gravity to the position of FIG. 4. This return action may possibly be facilitated or made more positive by corresponding resilient biassing means, such as, for example, a torsion spring (not shown) keyed to the shaft 18.

It will also be noted that the plate 19 is positioned generally downstream, in the sense of advance of the carousel structure, of the imaginary vertical plane identified by the axis of the shaft 18 and hence downstream of the bracket 14. This particular arrangement, though not essential in itself, has been found to be particularly advantageous for ensuring the safe operation of the device 1.

Figure 6:
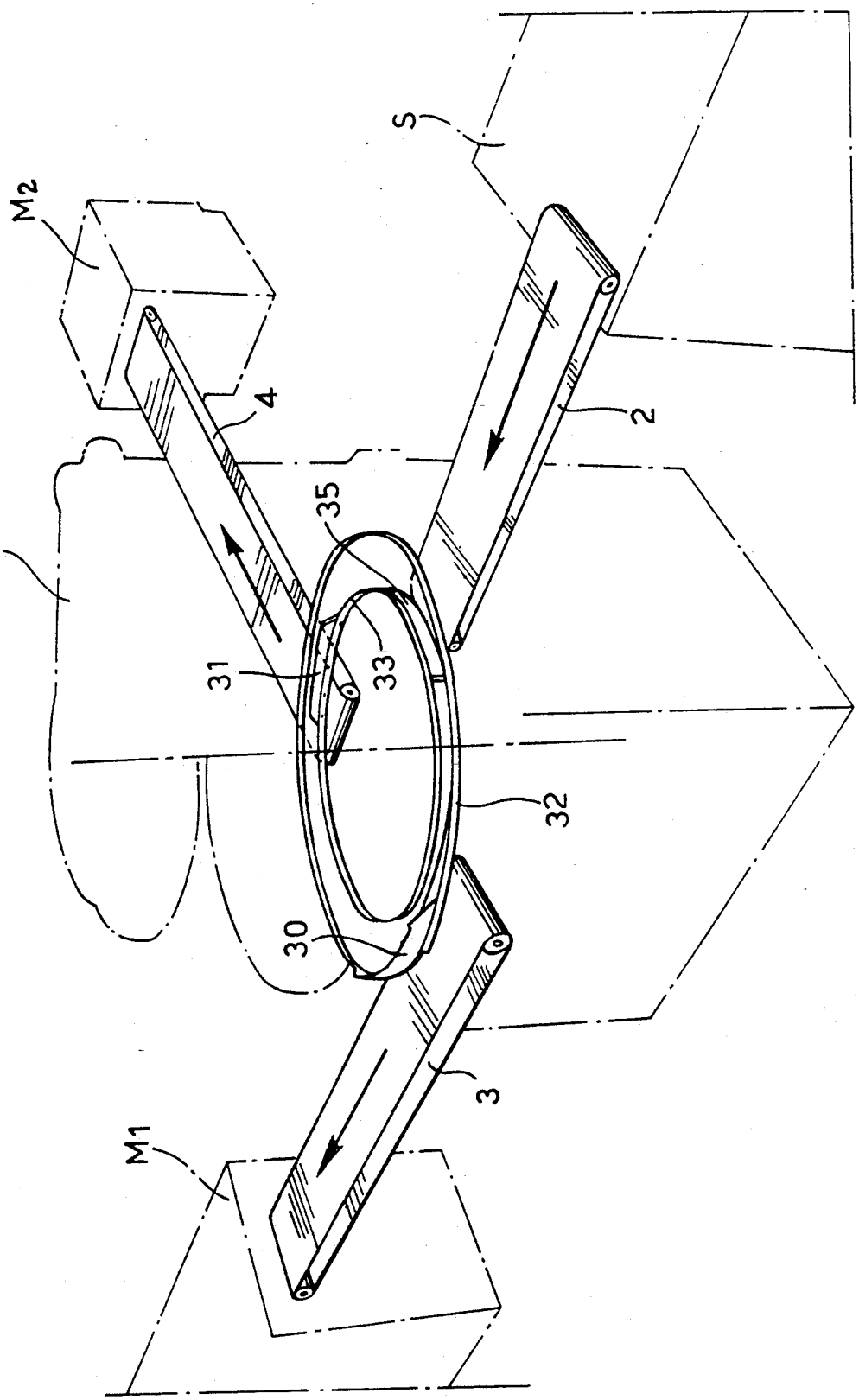
FIG. 6 is a schematic view corresponding approximately to FIG. 2 and intended to show in greater detail the criteria regulating the operation of the parts shown in FIGS. 4.

FIG. 6 shows (in an imaginary transparent reproduction of FIG. 2) the presence, within the fixed structure or cage which encloses the carousel structure including the transfer elements 8, of two arcuate cam elements 30 and 31 for cooperating with the followers 29 mounted on the cranks 27 of the elements 8.

The two cams 30, 31 are mounted on respective annular supports 32, 33 supported within the cage structure 11 and located outwardly (cam 30 and its support 32) and inwardly (cam 31 and its support 33) of the ring affected by the movement of the transfer elements 8, respectively.

In particular, the cam 30 (which is also partially visible in FIGS. 2 and 3) is intended to cooperate with the followers 29 of the cranks 27 mounted on the outer sides of the elements 8, whilst the cam 31 is intended to cooperate with the followers 29 mounted on the cranks 27 on the inner sides of the elements 8.

As stated, the cranks 27 may be mounted selectively on the outer sides or on the inner sides of the elements 8. In practice, this means that, during the rotation of the carousel structure of which they form parts, the elements 8 with the cranks 27 on their outer sides are raised (changing from the position of FIG. 4 to that of FIG. 5) when they travel through the arc of their path along which the cam 30 extends and then return to and remain in their lowered positions (FIG. 4) for the rest of their rotary path and hence also during their passage along the part of their path in correspondence with which the cam 31 extends.

The behaviour of the transfer elements 8 with cranks 27 on the inner side, however, will be exactly complementary. These latter transfer elements in fact remain in their lowered positions during their passage through the arc of their path in correspondence with which the cam 30 extends and are then raised (changing to the position of FIG. 5) when they pass the cam 31.

In the embodiment described herein, the cam 30 is positioned in correspondence with the angular position from which the output conveyor 3 extends. The cam 31, however, is positioned in correspondence with the output conveyor 4.

In practice, the device 1 operates according to the following criteria.

At the angular input position (conveyor 2), all the transfer elements 8 are in the position shown in FIG. 4, that is, in the lowered position in which the respective plates 19 lie a short distance from the slide plate 6 which is penetrated by the downstream end of the conveyor 2 to an the extent necessary to bring the articles P to a position in which they are safely aligned with the path of advance of the elements 8.

This can be achieved either by the radial penetration of the downstream end of the input conveyor 2 into the entrainment plate 6 to a depth which in practice corresponds to the region affected by the sliding of the transfer elements 8 or by the—at least partial—use of a ballistic effect, the articles P being made to arrive in alignment with the path of movement of the transfer elements 8 as a result of the inertia imparted to them by the conveyor 2 due to of its transfer speed.

For this purpose, as shown schematically in FIGS. 4 and 5, it may be useful for an auxiliary plate 34 which slopes generally downwardly from the outer edge of the transfer plate 19 to the inner edge to be associated with the plate 19 on its face (the front face in the sense of movement of the elements 8) from which the restraint appendage 20 extends so as to form a kind of funnel which holds the products P securely, preventing them from slipping, lifting, etc. (naturally, the terms outer and inner relate to the general structure of the device 1).

A screen 35 (FIG. 6) is then provided in the cage structure 11, in a position opposite the downstream end of the conveyor 2, for example, on the support 33 on which the cam 31 is mounted, and acts as a stop surface for the articles P coming from the conveyor 2.

The presence of the screen 35 thus ensures that the articles P are held in precise positions in the device 1 and do not tend to be thrown inwardly thereof by accident.

Naturally, the rotation of the carousel structure (and hence of the transfer elements 8) and the advance of the articles P on the conveyor 2 are synchronised (according to known criteria) so that each article P advances on to the plate 6 in alignment with the path of advance of the elements 8 before the radial restraint appendage 20 comes into alignment with the path of advance of the products P on the conveyor 2.

In other words, this means that each article P arrives on the plate 6 slightly upstream of the entrainment plate 19 which will catch it.

From these conditions, the plate takes charge, so to speak, of a respective article P and makes it slide on the conveyor plate 6.

In particular, each plate tends to make the respective article follow a generally arcuate path corresponding to the arcuate path followed by the transfer elements. Each article would therefore tend to escape from the respective plate 19 due to a centrifugal movement. This movement is prevented, however, by the reaction of each article against the radial restraint appendage 20 with which each plate 19 is provided in a generally blade-like configuration.

Each article P advancing on the plate 6 can leave the device 1 only when it is released by the respective entrainment plate 19 which is raised as a result of the pivoting of the corresponding crank 27. This may take place in correspondence with the output conveyor 3 (the first angular output position) or in correspondence with the conveyor 4 (the second angular output position) according to the position of the crank 27 on the corresponding entrainment element.

In the embodiment to which FIG. 2 relates, it is assumed that the cranks 27 are arranged on the outer and inner sides of the entrainment elements 8 in an alternating sequence.

This means that, in practice, each entrainment element 8 which is intended to be raised in correspondence with the output conveyor 3 is between two entrainment elements 8 which are intended to be raised in correspondence with the output conveyor 4 and vice versa. This arrangement causes the input flow of articles P to be divided into two identical output flows each having a flow rate equal to half the input flow.

Naturally, the criterion for this division can easily be changed by the adaptation of the machine.

For example, the cranks 27 can be arranged to follow an order of this type: two cranks on the outer side, one crank on the inner side, two cranks on the outer side, and so on. In this case, two thirds of the entrainment elements 8 will be raised to release their respective articles P in correspondence with the output conveyor 3, whilst the remaining third of the transfer elements 8 will be raised to release their respective articles P in correspondence with the conveyor 4.

It is also possible for the cams 30, 31 to be formed so that they can be moved selectively to positions such that they do not interfere with the followers 29 of the cranks 27.

Figure 3:
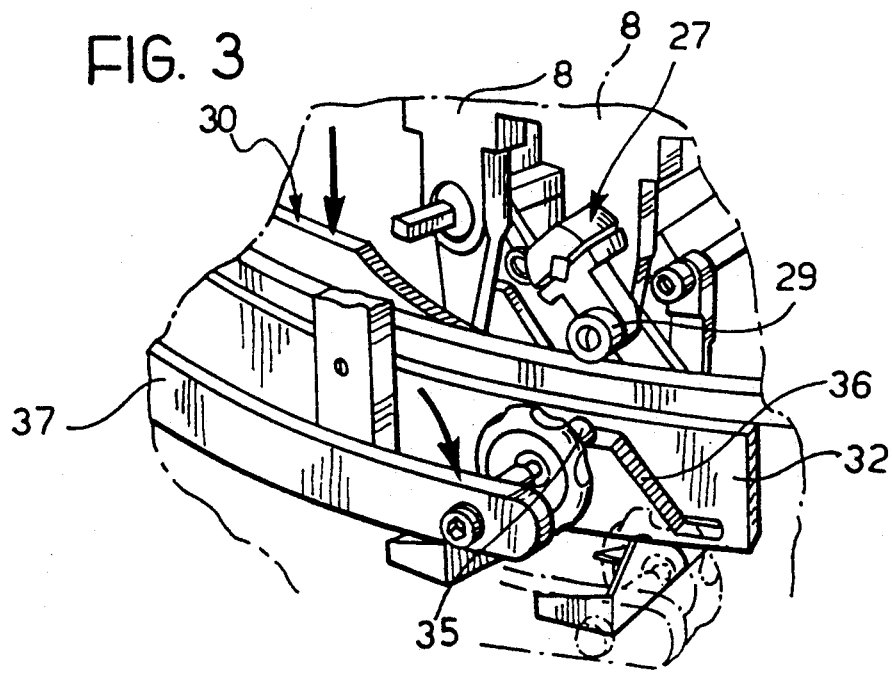
FIG. 3 is a broken away view of the part of the device indicated by the arrow III in FIG. 2, on an even larger scale.

This possibility is illustrated schematically in FIG. 3 which shows a solution in which, instead of being mounted in a fixed position on the corresponding support 32, the cam 30 is supported by pins 35 which can slide in inclined slots 36 in the support 32.

Thus, starting from the raised, operational position of FIG. 3 (in which the cam 30 can interfere with the followers 29 to cause the raising of the corresponding cranks 27), one can bring the cam 30 to a lowered position by acting on a curved rod 37 which connects the outer ends of the various pins 35 in the manner of a handrail, causing the pins to slide along the slots 37 until they are brought to positions (shown schematically in broken outline in FIG. 3) in which the cam 30 can no longer interfere with the followers 29 of the cranks 27.

A solution of this type may be used, for example, if greater flexibility is desired in the selection of the possible output channels.

For example, the addition of a further output conveyor 38, whose outline is indicated schematically in broken outline in FIG. 1 to the structure of FIG. 1 may be considered and it may be decided to associate with this further conveyor a respective "outer" cam which, like the cam 30, can also be raised and lowered selectively.

A device with this configuration can easily be adapted to operate in at least two different conditions, that is:

in a first condition in which the input flow of articles P is divided between the conveyor 3 and the output conveyor 4 (the cams 30 and 31 associated with the conveyors 3 and 4 raised and the similar cam associated with the conveyor 38 lowered), and in a second condition in which, on the other hand, the flow is divided between the conveyor 4 and the conveyor 38 (the cam 30 being lowered and the homologous cam of the conveyor 38 raised).

It is also considered preferable that the output conveyors 3, 4, like the input conveyor 2, should extend a certain distance into the arcuate path which the articles P are made to follow by the entrainment elements 8. This is to ensure the precise transfer of the products being discharged without disturbance of their forward movement. For this purpose, a preferred solution can thus be envisaged, in which the device 1 carries associated short conveyor portions intended to act as input and output conveyors for connection with other conveyors of the plant.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A device for transferring a flow of articles from an angular input position to at least one angular output position, comprising:
    a surface for the sliding of the articles from the angular input position to the at least one angular output position;
    a carousel structure including a plurality of transfer elements movable between the angular input position and the at least one angular output position as a result of the rotation of the structure, said transfer elements being movable between an operative position in close proximity to the slide surface for the entrainment of the articles, and a rest position spaced from the slide surface respectively;
    operating means for selectively causing at least some of the transfer elements which arrive at the angular input position in the operative position to move to the rest position upon arrival at said at least one angular output position, said operating means comprising at least one reaction structure for cooperating with the transfer elements to cause them to move to the rest position, said at least one reaction structure being movable selectively to a position in which it is disengaged from the transfer elements so that, when they pass the reaction structure which has been moved to the disengaged position, the transfer elements remain in their operative positions for the entrainment of the articles.

2. A device according to claim 1, which further comprises an input conveyor for supplying the articles to the carousel structure at the angular input position in a substantially radial direction relative to the carousel structure.

3. A device according to claim 2, wherein the input conveyor penetrates the slide surface for the articles, in a substantially radial direction relative to the carousel structure.

4. A device according to claim 1, which further comprises at least one output conveyor for removing the articles from the slide surface, the at least one output conveyor extending from the at least one angular output position in a substantially tangential direction relative to the carousel structure.

5. A device according to claim 4, wherein the at least one output conveyor has an end which is upstream relative to the direction of movement of said articles, and which extends into the path of movement of the transfer elements.

6. A device according to claim 1, wherein the operating means are divided at least into first and second sets and the transfer elements are also divided at least into first and second sets adapted to be acted upon respectively by said first and second sets of operating means whereby the transfer elements of said first and second sets are moved to the rest position upon arrival at said first and second output positions respectively.

7. A device according to claim 1, wherein the transfer elements follow a substantially circular path.

8. A device according to claim 1, further comprising a screen for stopping the movement of the articles supplied to the device, the screen being located inside the path of movement of the transfer elements and in alignment with the angular input position.

9. A device for transferring a flow of articles from an angular input position to at least one angular output position, comprising:
    a surface for the sliding of the articles from the angular input position to the at least one angular output position;
    a carousel structure including a plurality of transfer elements movable between the angular input position and the at least one angular output position as a result of rotation of the structure, said transfer elements being movable between an operative position in close proximity to the slide surface for entrainment of the articles, and a rest position spaced from the slide surface respectively, each of said transfer elements including a plate which extends radially of the carousel structure to entrain the articles, and a lever mechanism associated with the plate for causing its movement between said operative position and said rest position, said lever mechanism having a general articulated-parallelogram-like structure; and
    operating means for selectively causing at least some of the transfer elements which arrive at the angular input position in the operative position to move to the rest position upon arrival at said at least one angular output position.

10. A device according to claim 9, which further comprises an input conveyor for supplying the articles to the carousel structure at the angular input position in a substantially radial direction relative to the carousel structure.

11. A device according to claim 10, wherein the input conveyor penetrates the slide surface for the articles, in a substantially radial direction relative to the carousel structure.

12. A device according to claim 9, which further comprises at least one output conveyor for removing the articles from the slide surface, the at least one output conveyor extending from the at least one angular output position in a substantially tangential direction relative to the carousel structure.

13. A device according to claim 12, wherein the at least one output conveyor has an end which is upstream relative to the direction of movement of said articles, and which extends into the path of movement of the transfer elements.

14. A device according to claim 9, wherein the operating means are divided at least into first and second sets and the transfer elements are also divided at least into first and second sets adapted to be acted upon respectively by said first and second sets of operating means whereby the transfer elements of said first and second sets are moved to the rest position upon arrival at said first and second output positions respectively.

15. A device according to claim 9, wherein the transfer elements follow a substantially circular path.

16. A device according to claim 9, further comprising a screen for stopping the movement of the articles supplied to the device, the screen being located inside the path of movement of the transfer elements and in alignment with the angular input position.

17. A device for transferring a flow of articles from an angular input position to at least one angular output position, comprising:
- a surface for the sliding of the articles from the angular input position to the at least one angular output position;
- a carousel structure including a plurality of transfer elements movable between the angular input position and the at least one angular output position as a result of the rotation of the structure, said transfer elements being movable between an operative position in close proximity to the slide surface for the entrainment of the articles, and a rest position spaced from the slide surface respectively, each transfer element including a plate for entraining the articles, the plate extending radially of the device and having an outer appendage which extends tangentially of the device to restrain the articles radially during their entrainment on the slide surface; and a further guide plate associated with each entrainment plate and extending from the face of the plate which is intended to cooperate with the articles in their entrainment movement, the further plate being generally inclined at a distance from the entrainment plate which decreases progressively towards the inside of the device so that the further plate constitutes a funnel formation for holding the articles securely during their entrainment in the device and;
- operating means for selectively causing at least some of the transfer elements which arrive at the angular input position in the operative position to move to the rest position upon arrival at said at least one angular output position.

18. A device according to claim 17, wherein each transfer element includes a formation for attachment to the carousel structure, and the plate for entraining the articles is arranged generally downstream of the attachment formation relative to the direction of movement of the transfer elements.

19. A device for transferring a flow of articles from an angular input position to at least one angular output position, comprising:
- a surface for the sliding of the articles from the angular input position to the at least one angular output position;
- a carousel structure including a plurality of transfer elements movable between the angular input position and the at least one angular output position as a result of the rotation of the structure, said transfer elements being movable between an operative position in close proximity to the slide surface for the entrainment of the articles, and a rest position spaced from the slide surface respectively, and
- operating means for selectively causing at least some of the transfer elements which arrive at the angular input position in the operative position to move to the rest position upon arrival at said at least one angular output position, said operating means having for each transfer element, a follower element adapted to cause the transfer element to move between its operative position and its rest position, and said operating means further having at least one cam which is arranged in a position corresponding with the at least one angular position and is adapted to cooperate with the follower elements associated with the transfer elements passing the at least one angular output position in order to cause those transfer element to move from their operative positions to their rest positions, resulting in their disengagement from the articles;
- wherein each transfer element carries, on opposite sides of a path of movement thereof, associated means for attaching a follower element for causing said transfer element to move between said operative and rest positions, and wherein at least a first cam extends on one side of said path of movement of the transfer elements in a position corresponding with a first angular output position, and at least a second cam extends on the other said of the path of movement of the transfer elements in a position corresponding with a second angular output position respectively, whereby the transfer elements move from their operative positions to their rest positions respectively, according to the side on which the respective follower element is mounted.

20. A device for transferring a flow of articles from an angular input position to at least one angular output position, comprising;
- a surface for the sliding of the articles from the angular input position to the at least one angular output position;
- a carousel structure including a plurality of transfer elements movable between the angular input position and the at least one angular output position as a result of the rotation of the structure, said transfer elements being movable between an operative position in close proximity to the slide surface for the entrainment of the articles, and a rest position spaced from the slide surface respectively; and
- operating means for selectively causing at least some of the transfer elements which arrive at the angular input position in the operative position to move to the rest position upon arrival at said at least one angular output position, said operating means having for each transfer element, a follower element adapted to cause the transfer element to move between its operative position and its rest position, and said operating means further having at least one cam which is arranged in a position corresponding with the at least one angular output position and is adapted to cooperate with the follower elements associated with the transfer elements passing the at least one angular output position in order to cause those transfer elements to move from their operative positions to their rest positions, resulting in their disengagement from the articles;
- wherein the at least one cam is mounted on the device in such a manner that it can move between an operating position in which the cam can cooperate with follower elements mounted on the transfer elements, and in inactive position in which the cam has substantially no effect on the follower elements.

* * * * *